US010061169B2

(12) United States Patent
Suzuki (10) Patent No.: US 10,061,169 B2
(45) Date of Patent: Aug. 28, 2018

(54) ARRAY SUBSTRATE, LIQUID CRYSTAL DISPLAY PANEL AND LIQUID CRYSTAL DISPLAY (71) Applicant: BOE TECHNOLOGY GROUP CO., LTD., Beijing (CN)

(72) Inventor: Teruaki Suzuki, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 191 days.

(21) Appl. No.: 14/125,732

(22) PCT Filed: Dec. 12, 2012

(86) PCT No.: PCT/CN2012/086471
§ 371 (c)(1),
(2) Date: Dec. 12, 2013

(87) PCT Pub. No.: WO2014/015621
PCT Pub. Date: Jan. 30, 2014

(65) Prior Publication Data
US 2015/0219952 A1 Aug. 6, 2015

(30) Foreign Application Priority Data
Jul. 27, 2012 (CN) .......................... 2012 1 0265619

(51) Int. Cl.
G02F 1/1343 (2006.01)
G09G 3/36 (2006.01)
G02F 1/1337 (2006.01)

(52) U.S. Cl.
CPC .... *G02F 1/13439* (2013.01); *G02F 1/134309* (2013.01); *G02F 1/134363* (2013.01);
(Continued)

(58) Field of Classification Search
CPC ... G02F 2001/134381; G02F 1/134363; G02F 2001/134372
See application file for complete search history.

(56) References Cited

U.S. PATENT DOCUMENTS

2003/0052847 A1  3/2003  Okishiro et al.
2006/0232537 A1  10/2006 Kim et al.
(Continued)

FOREIGN PATENT DOCUMENTS

CN    2705805 Y    6/2005
CN    102169259 A   8/2011
(Continued)

OTHER PUBLICATIONS

First Office Action issued by the Chinese Patent Office for Chinese Patent Application No. 201210265619.6 dated May. 6, 2014, 9pgs.
(Continued)

*Primary Examiner* — Jessica M Merlin (57) ABSTRACT

An array substrate(6), a liquid crystal display panel and a liquid crystal display, and the array substrate(6), corresponding to a plurality of pixel regions, each of which comprises a second electrode(2) and a third electrode(3) on a side close to a liquid crystal layer(30), the second electrode(2) comprising at least one second electrode strip, the third electrode (3) comprising at least one third electrode strip; each of the pixel regions of the array substrate(6) further comprising a fourth electrode(4) on the side close to the liquid crystal layer(30), the fourth electrode(4) comprising at least one fourth electrode strip located between the second electrode strip and the third electrode strip that are adjacent; and an electric potential of the fourth electrode(4) falling between an electric potential of the second electrode(2) and an electric potential of the third electrode(3).

18 Claims, 6 Drawing Sheets (52) U.S. Cl.
CPC ............... *G09G 3/3648* (2013.01); *G02F 2001/133742* (2013.01); *G02F 2001/134381* (2013.01); *G09G 2300/0426* (2013.01); *G09G 2300/0447* (2013.01); *G09G 2300/0852* (2013.01); *G09G 2320/0233* (2013.01)

(56) References Cited

U.S. PATENT DOCUMENTS

| | | | |
|---|---|---|---|
| 2007/0115417 A1* | 5/2007 | Ge et al. ...................... | 349/141 |
| 2008/0273134 A1 | 11/2008 | Kim et al. | |
| 2009/0046234 A1* | 2/2009 | Tanaka ....................... | 349/141 |
| 2010/0091231 A1 | 3/2010 | Nishimura et al. | |
| 2010/0128189 A1* | 5/2010 | Teranishi et al. ............ | 349/33 |
| 2010/0207854 A1* | 8/2010 | Chen et al. ................... | 345/87 |
| 2011/0273638 A1* | 11/2011 | Tsai et al. ..................... | 349/33 |
| 2012/0069256 A1* | 3/2012 | Huang et al. ................. | 349/33 |
| 2012/0154368 A1* | 6/2012 | Sakurai ............ | G02F 1/134363 345/212 |
| 2012/0162558 A1 | 6/2012 | Chung et al. | |

FOREIGN PATENT DOCUMENTS

| | | |
|---|---|---|
| CN | 102789100 A | 11/2012 |
| CN | 202854461 U | 4/2013 |
| FR | 2872595 A1 | 1/2006 |
| JP | 2002-139736 | 5/2002 |
| WO | 2011083616 A1 | 7/2011 |
| WO | 2011086743 A1 | 7/2011 |

OTHER PUBLICATIONS

English translation of a First Office Action issued by the Chinese Patent Office for Chinese Patent Application No. 201210265619.6 dated May 6, 2014, 8pgs.
International Search Report for International Application No. PCT/CN2012/086471, 14pgs.
English translation of Chinese Patent No. 2705805, 9pgs.
English translation of Chinese Patent No. 102169259, 19pgs.
English translation of Chinese Patent No. 102789100, 17pgs.
English translation of Chinese Patent No. 2872595, 17pgs.
English translation of International Application No. WO 2011/083616, 22pgs.
English translation of International Application No. WO 2011/086743, 18pgs.
International Preliminary Report on Patentability for International Application No. PCT/CN2012/086471 dated Jan. 27, 2015, nine (9) pages.
Extended European Search Report issued by the European Patent Office in corresponding European Patent Application No. 12878646.4; dated Feb. 10, 2016; 10 pages.
European Patent Office Action for application 12878646.4-1914, dated Jan. 24, 2017, pp. 8.
Second Office Action issued by the European Patent Office dated Jan. 8, 2018 for the European patent application No. 12878646.4 (4 pgs.).

* cited by examiner

ARRAY SUBSTRATE, LIQUID CRYSTAL DISPLAY PANEL AND LIQUID CRYSTAL DISPLAY

CROSS REFERENCE TO RELATED APPLICATIONS

This application is based on International Application No. PCT/CN2012/086471 filed on Dec. 12, 2012, which claims priority to Chinese National Application No. 201210265619.6 filed on Jul. 27, 2012, the contents of which are incorporated herein by reference.

TECHNICAL FIELD

Embodiments of the present invention relate to an array substrate, a liquid crystal display panel and a liquid crystal display.

BACKGROUND

In a thin film transistor liquid crystal display (TFT-LCD), by means of utilizing the intensity variation of an electric field across a liquid crystal layer, the orientation of liquid crystal molecules is changed, and thus the strength of transmitted light is controlled to display an image. Generally speaking, a complete liquid crystal display panel must have a backlight module, a polarizer, an upper substrate and a lower substrate, and a layer of liquid crystal molecules filled in a cell composed of the two substrates.

An electric field generated in a liquid crystal display is substantially perpendicular to a substrate plane, and is used to control the state of liquid crystal molecules. This liquid crystal display is generally referred to as a vertical electric field type liquid crystal display. In the vertical electric field type liquid crystal display, a first electrode is formed on a lower substrate sandwiching a liquid crystal layer, a second electrode is formed on an upper substrate, and after a voltage is applied to them, an electric field substantially perpendicular to the substrate plane that begins from the first electrode and guides to the second electrode will be formed.

An electric field generated in a liquid crystal display is substantially parallel to a substrate plane, and is used to control the state of liquid crystal molecules. This liquid crystal display is generally referred to as a transverse electric field type liquid crystal display. In the transverse electric field type liquid crystal display, a first electrode and a second electrode are usually formed on a lower substrate sandwiching a liquid crystal layer, and after a voltage is applied to them, an electric field substantially parallel to the substrate plane that begins from the first electrode and guides to the second electrode will be formed.

Figure 1:
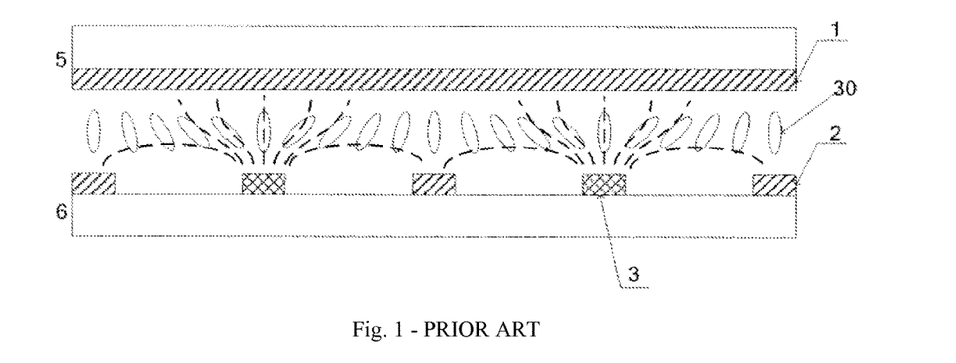
FIG. 1 is a schematically sectional view illustrating a structure of a liquid crystal display panel in prior art.

In prior art, there is also a case that a liquid crystal display with a vertical electric field and a transverse electric field is manufactured by combining advantages of the vertical electric field and the transverse electric field. As shown in FIG. 1, the liquid crystal display includes an upper substrate 5 and a lower substrate 6, and a liquid crystal layer 30 filled between the upper substrate 5 and the lower substrate 6. Herein, the upper substrate 5 includes a first electrode (common electrode) 1 on a side close to the liquid crystal layer 30, and the lower substrate 6 includes a second electrode (common electrode) 2 and a third electrode (pixel electrode) 3 that are located on a side close to the liquid crystal layer 30. After a voltage is applied, the first electrode 1 and the second electrode 2 are equal in electric potential, and no electric field is generated between them. The first electrode 1 and the third electrode 3 are unequal in electric potential, and a vertical electric field perpendicular to the substrate plane is generated. The second electrode 2 and the third electrode 3 are unequal in electric potential, and a transverse electric field parallel to the substrate plane is generated.

Compared with the transverse electric field type liquid crystal display, the number of bright and dark stripes in the liquid crystal display with the vertical electric field and the transverse electric field can be reduced. However, in a space region between the second electrode 2 and the third electrode 3 in this substrate, the deflection degree of liquid crystal molecules is still inadequate, thereby resulting in a fact that a corresponding zone is not bright enough. Namely, the display quality of the liquid crystal display may be affected. In this case, if an adequate brightness needs to be ensured, then it is necessary for a driving voltage of the second electrode 2 and the third electrode 3 to be increased.

SUMMARY

According to embodiments of the present invention, there are provided an array substrate, a liquid crystal display panel and a liquid crystal display. There are a vertical electric field and a transverse electric field in the display panel at the same time, so that the vertical electric field distribution is relatively uniform, and the display quality of the liquid crystal display is improved.

According to one aspect of an embodiment of the invention, there is provided an array substrate, corresponding to a plurality of pixel regions, each of which comprises a second electrode and a third electrode on a side close to a liquid crystal layer, the second electrode comprising at least one second electrode strip, the third electrode comprising at least one third electrode strip; each of the pixel regions of the array substrate further comprising a fourth electrode on the side close to the liquid crystal layer, the fourth electrode comprising at least one fourth electrode strip located between the second electrode strip and the third electrode strip that are adjacent; and an electric potential of the fourth electrode falling between an electric potential of the second electrode and an electric potential of the third electrode.

In an embodiment of the invention, in each of the pixel regions of the array substrate, there are more than one for each of the second electrode strip, the third electrode strip and the fourth electrode strip, and the second electrode strips are electrically connected with each other, the third electrode strips are electrically connected with each other, and the fourth electrode strips are electrically connected with each other.

In an embodiment of the invention, the second electrode strip, the third electrode strip and the fourth electrode strip are different from each other in a width.

In an embodiment of the invention, the second electrode strip, the third electrode strip and the fourth electrode strip are in the same plane.

In an embodiment of the invention, the fourth electrode is in an electrically suspended state.

In an embodiment of the invention, a width of a spacing between the second electrode strip and the fourth electrode strip is different from a width of a spacing between the third electrode strip and the fourth electrode strip.

In an embodiment of the invention, widths of spacing between any adjacent the second electrode strip and the fourth electrode strip are different from each other, and widths of spacing between any adjacent the third electrode strip and the fourth electrode strip are different from each other.

In an embodiment of the invention, the second electrode strip, the third electrode strip and the fourth electrode strip each are bent into a V shape.

According to another aspect of an embodiment of the invention, there is provided a liquid crystal display panel, comprising an upper substrate and a lower substrate cell-assembled, and a liquid crystal layer filled between the upper substrate and the lower substrate, an initial orientation state of liquid crystal molecules in the liquid crystal layer is perpendicular to the upper substrate and the lower substrate; the lower substrate is the above array substrate.

In an embodiment of the invention, the upper substrate comprises a first electrode on a side close to the liquid crystal layer.

In an embodiment of the invention, the first electrode and the second electrode are connected to each other.

In an embodiment of the invention, the upper substrate further comprises: a protective layer formed on the first electrode.

According to still another aspect of an embodiment of the invention, there is provided a liquid crystal display, comprising the above liquid crystal display panel.

With respect to the array substrate, the liquid crystal display panel and the liquid crystal display provided by embodiments of the invention, at least one fourth electrode is provided between the second electrode and the third electrode of the array substrate separated from each other, and the fourth electrode is not connected to each of the second electrode and the third electrode. After a voltage is applied, an electric field is generated between the third electrode and the fourth electrodes on two sides of it, and electric fields are generated between the fourth electrode and the second electrode and the third electrode on two sides of it, respectively. Thereby, it is possible that the deflection degree of liquid crystal molecules in the space region between the second electrode and the third electrode is increased without increasing the driving voltage of the second electrode and the third electrode, and accordingly, the luminance of a corresponding region is enhanced. In turn, the display quality of the liquid crystal display panel and the liquid crystal display can be improved. Further, a first electrode that is connected to a second electrode may be provided on a color filter substrate, so that a vertical electric field can be generated between the first electrode and each of the third electrode and the fourth electrode. Thus, the number of bright and dark stripes in the liquid crystal display can be reduced.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 2:
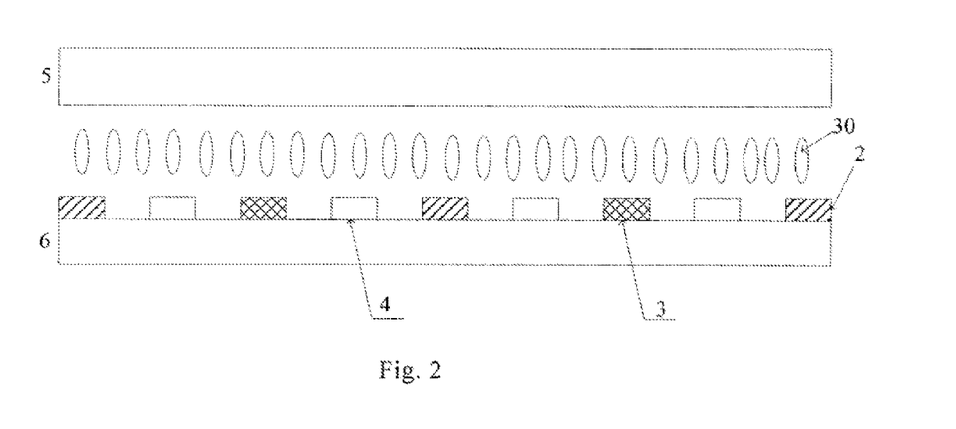
FIG. 2 is a schematically sectional view illustrating a structure of an array substrate provided by an embodiment of the invention.

An array substrate provided by an embodiment of the invention, as shown in FIG. 2, corresponds to a plurality of pixel regions, and the array substrate 6 includes a second electrode 2 and a third electrode 3 that are located on a side close to the liquid crystal layer 30 in correspondence to each of the pixel regions. The second electrode 2 includes at least one second electrode strip, and the third electrode 3 includes at least one third electrode strip. For example, the electrode strip here may be a comb-teeth electrode portion of a comb-shaped electrode. For example, the second electrode strip and the third electrode strip are disposed alternately on the array substrate 6.

The array substrate 6 further includes a fourth electrode 4 that is located on the side close to the liquid crystal layer 30 in correspondence to each of the pixel regions. The fourth electrode 4 includes at least one fourth electrode strip that is located between the second electrode strip and the third electrode strip that are adjacent; and an electric potential of the fourth electrode falls between an electric potential of the second electrode and an electric potential of the third electrode.

In an embodiment of the invention, for the array substrate 6, in each of the pixel regions, there are more than one for each of the second electrode strip, the third electrode strip and the fourth electrode strip, and moreover, the second electrode strips are electrically connected to each other, the third electrode strips are electrically connected to each other, and the fourth electrode strips are electrically connected to each other.

The second electrode strip, the third electrode strip and the fourth electrode strip may be in the same plane.

In an embodiment of the invention, the fourth electrode is in an electrically suspended state.

In an embodiment of the invention, the second electrode strip of the second electrode 2, the third electrode strip of the third electrode 3 and the fourth electrode strip of the fourth electrode 4 may have the same width or different widths.

Figure 7:
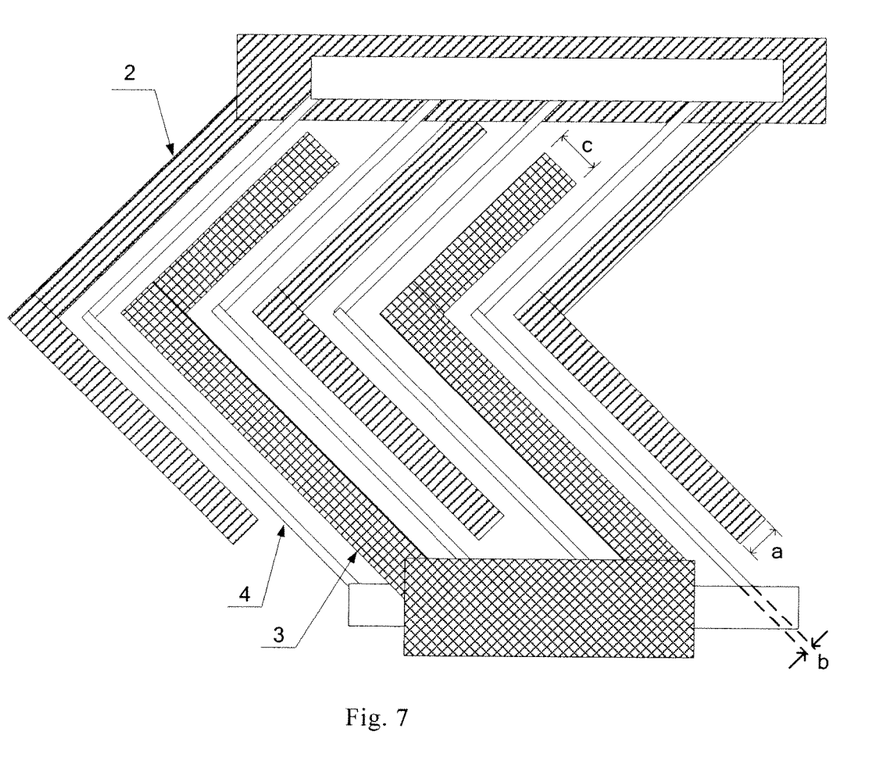
FIG. 7 is a schematically top view illustrating a structure of electrode strips of a lower substrate of a liquid crystal display panel provided by an embodiment of the invention.

With reference to FIG. 7, a width a of the second electrode strip, a width b of the fourth electrode strip, and a width c of the third electrode strip are not the same as each other.

In an embodiment of the invention, the second electrode strip of the second electrode 2, the third electrode strip of the third electrode 3 and the fourth electrode strip of the fourth electrode 4 on the array substrate 6 may vary continuously in width on the plane. For example, each of the second electrode strip, the third electrode strip and the fourth electrode strip varies continuously in a manner of being wider in the upper part of the picture, and being narrower in the lower part of the picture. Of course, this is merely an example, and continuous variations in other form may also be possible.

In an embodiment of the invention, further, the second electrode strip of the second electrode 2, the third electrode strip of the third electrode 3 and the fourth electrode strip of the fourth electrode 4 on the array substrate 6 may take a form of a step on the plane. For example, each of the second electrode strip, the third electrode strip and the fourth electrode strip is narrower in the upper part of the picture, wider in the lower part of the picture, and changed from narrow to wide gradually in steps. Certainly, this is merely an example, and stepwise changes in other forms may also be possible.

Figure 8:
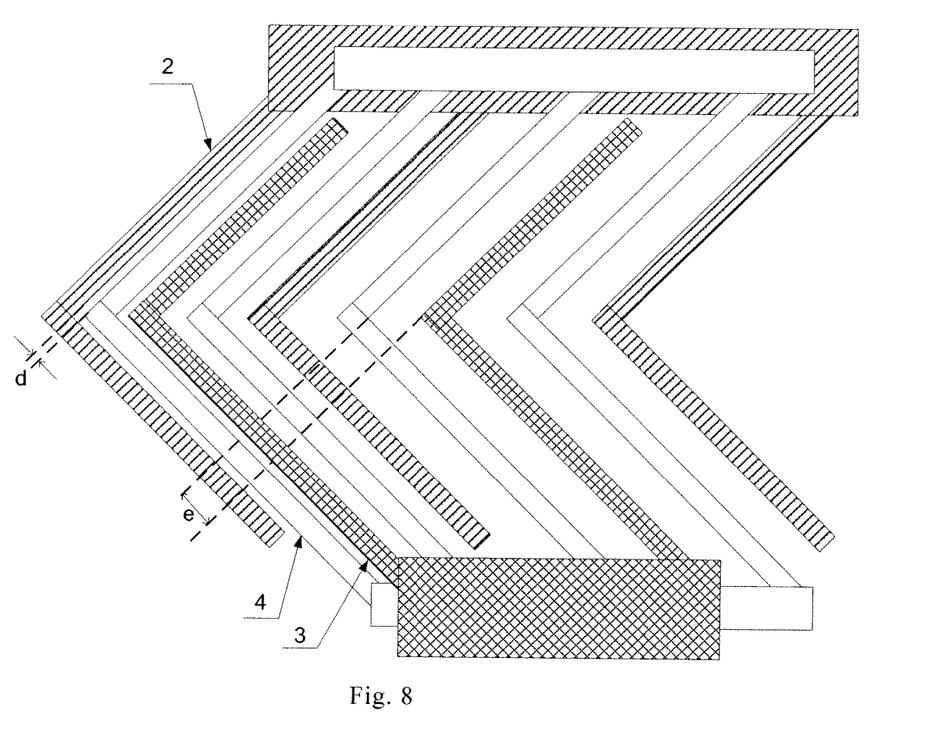
FIG. 8 is a schematically top view illustrating a structure of electrode strips of a lower substrate of still another liquid crystal display panel provided by an embodiment of the invention.

In an embodiment of the invention, a width of a spacing between the second electrode strip and the fourth electrode strip and a width of a spacing between the third electrode strip and the fourth electrode strip may be the same or different. In the embodiment of the invention, for example, as shown in FIG. 8, a space width d between the second electrode strip and the fourth electrode strip and a space width e between the third electrode strip and the fourth electrode strip are different. For example, in one pixel region, if a spacing on the left side of the picture is smaller than a spacing on the right side of the picture, the V-T property will be different, and the viewing angle property is better as well.

In an embodiment of the invention, widths of spacing between any adjacent the second electrode strip and the fourth electrode strip are different from each other, and widths of spacing between any adjacent the third electrode strip and the fourth electrode strip are different from each other.

In an embodiment of the invention, the second electrode strip, the third electrode strip and the fourth electrode strip each are bent into a V shape, and other bending shape, the shape of a folded line or the shape of a straight line may also be possible.

Figure 3:
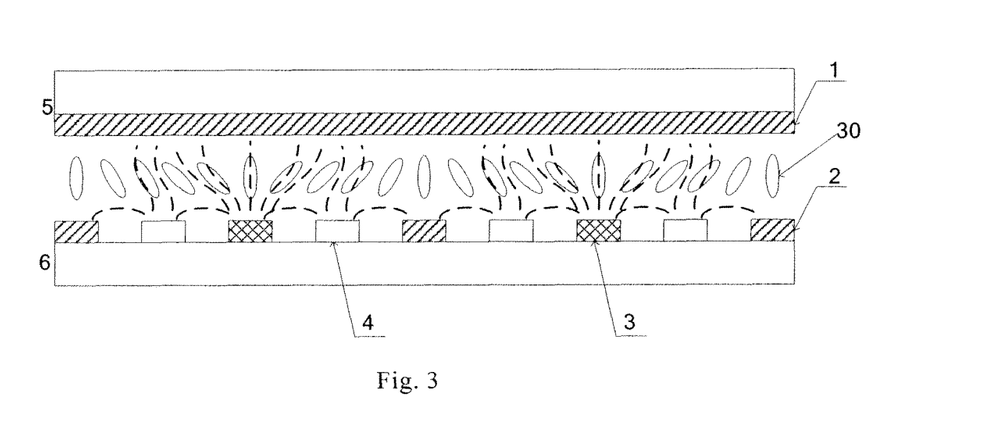
FIG. 3 is a schematically sectional view illustrating a structure of a liquid crystal display panel provided by another embodiment of the invention.
Figure 4:
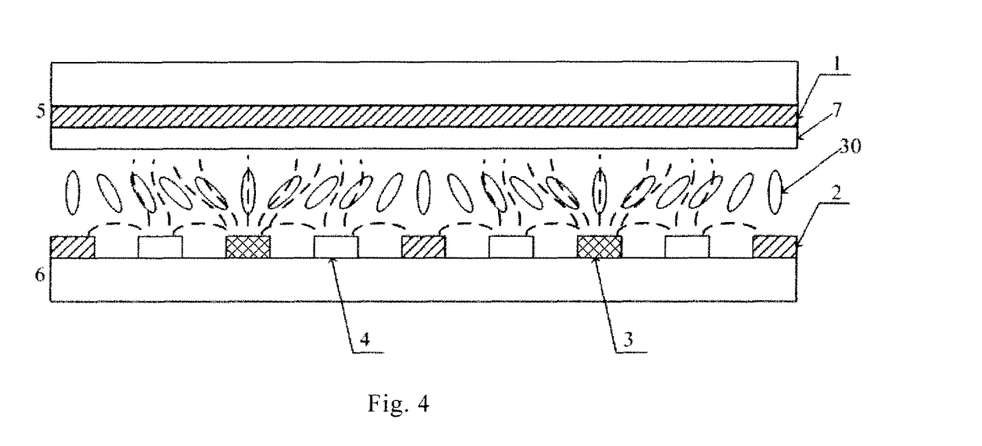
FIG. 4 is a schematically sectional view illustrating another structure of a liquid crystal display panel provided by another embodiment of the invention.
Figure 5:
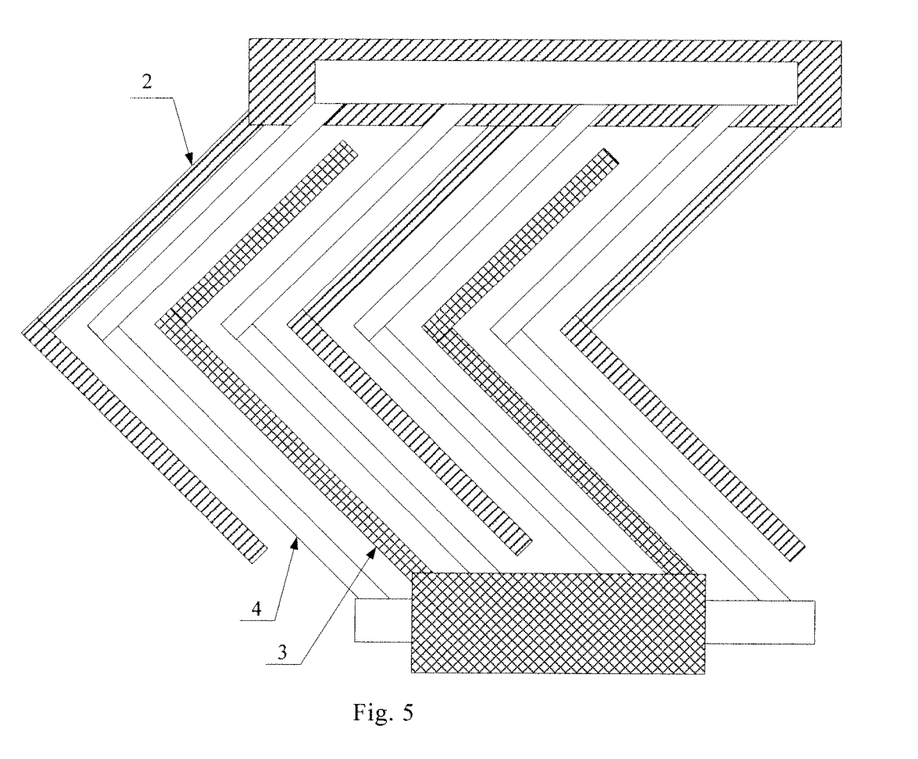
FIG. 5 is a schematically top view illustrating a structure of a lower substrate of a liquid crystal display panel provided by an embodiment of the invention.

A liquid crystal display panel provided by an embodiment of the invention, as shown in FIG. 3 to FIG. 5, includes an upper substrate (it may also be referred to as a color filter substrate) 5 and a lower substrate (it may also be referred to as an array substrate) 6 that are cell-assembled, and a liquid crystal layer 30 filled between the upper substrate 5 and the lower substrate 6, and an initial orientation state of liquid crystal molecules in the liquid crystal layer is perpendicular to the upper substrate 5 and the lower substrate 6. For example, the liquid crystal molecules in the liquid crystal layer have a positive dielectric anisotropy.

In an example of the invention, the upper substrate 5 includes a first electrode 1 on a side close to the liquid crystal layer. In the embodiment, the first electrode 1 is set to be a common electrode (Com electrode). However, the first electrode 1 is not necessary, and the first electrode 1 may not be provided on the upper substrate 5. The lower substrate 6 corresponds to a plurality of pixel regions, and the lower substrate 6 includes a second electrode 2 and a third electrode 3 that are located on the side close to the liquid crystal layer 30 in each of the pixel regions. The second electrode 2 includes at least one second electrode strip, and the third electrode 3 includes at least one third electrode strip. For example, the second electrode strip and the third electrode strip may be disposed alternately.

In an embodiment of the invention, the lower substrate 6 further includes a fourth electrode 4 that is located on the side close to the liquid crystal layer 30 in each of the pixel regions. The fourth electrode 4 includes at least one fourth electrode strip that is located between the second electrode strip and the third electrode strip that are adjacent; and an electric potential of the fourth electrode falls between an electric potential of the second electrode and an electric potential of the third electrode.

In an embodiment of the invention, the second electrode 2 is set to be a common electrode (Com electrode) as well, namely, the first electrode 1 and the second electrode 2 are connected to each other; but they may be arranged to not be connected with each other and have different electric potentials, either. The third electrode 3 is set to be a pixel electrode (Pix electrode). Where, when no voltage is applied, an orientation (i.e. an initial orientation) of liquid crystal molecules in the liquid crystal layer 30 is perpendicular to the upper substrate 5 and the lower substrate 6.

In an embodiment of the invention, for the lower substrate, in each of the pixel regions, there are more than one for each of the second electrode strip, the third electrode strip and the fourth electrode strip, and moreover, the second electrode strips are electrically connected to each, the third electrode strips are electrically connected to each, and the fourth electrode strips are electrically connected to each.

In an embodiment of the invention, the second electrode strip of the second electrode 2, the third electrode strip of the third electrode 3 and the fourth electrode strip of the fourth electrode 4 may have the same width or different widths. For example, with reference to FIG. 7, a width a of the second electrode strip, a width b of the fourth electrode strip, and a width c of the third electrode strip are not the same as each other.

In an example of the invention, the fourth electrode 4 is located on the same plane as the second electrode 2 and the third electrode 3. Moreover, between electrode strips of the second electrode 2 and the third electrode 3 that are adjacent, a plurality of electrode strips of the fourth electrode 4 may be provided. And, the fourth electrode 4 is not connected to each of the first electrode 1, the second electrode 2 and the third electrode 3, namely, the fourth electrode 4 is in an electrically suspended state. As such, under an electric field, an electric potential of the fourth electrode 4 falls between an electric potential of the first electrode 1 or the second electrode 2 and an electric potential of the third electrode 3.

Figure 6:
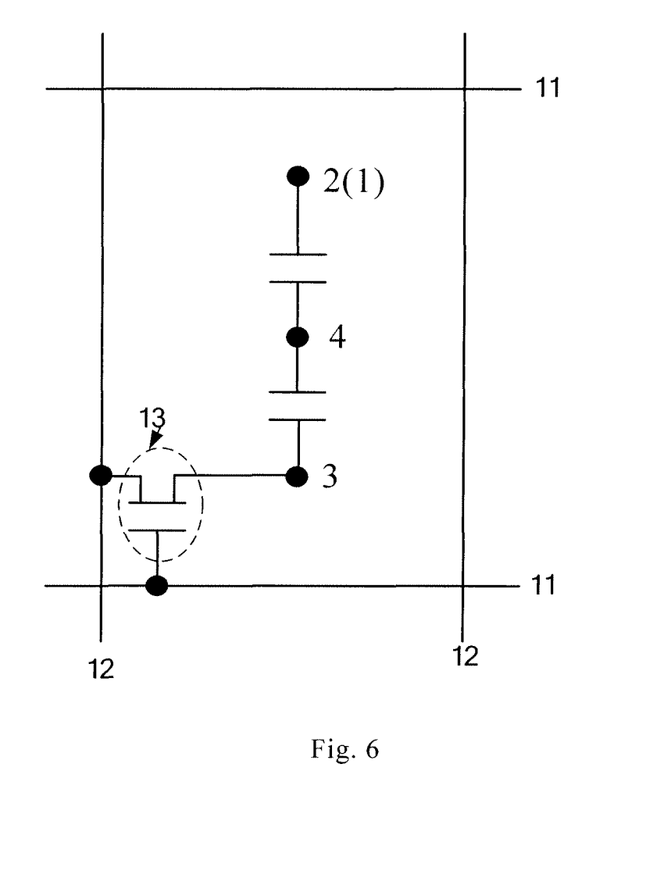
FIG. 6 is a diagram illustrating an equivalent circuit of a lower substrate of a liquid crystal display panel provided by an embodiment of the invention.

For example, when a voltage is applied to the liquid crystal display panel, it is possible that a voltage V1 applied to the first electrode 1 and the second electrode 2 is set to be smaller than a voltage V2 applied to the fourth electrode 4, and the voltage V2 applied to the fourth electrode 4 is set to be smaller than a voltage V3 applied to the third electrode 3. That is, V1<V2<V3. An equivalent circuit diagram of a pixel region of the liquid crystal display panel is shown in FIG. 6, and within the pixel region defined by a gate line 11 and a data line 12 that cross over each other, there are applied three voltages, which are V3 conducted to the third electrode 3 from the data line 12 via a TFT 13, V1 conducted to the second electrode 2 from the first electrode 1, and V2 separately conducted to the fourth electrode 4, respectively.

The relationship among the three voltages satisfies the above formula V1<V2<V3.

After a voltage is applied, as shown in FIG. 3, the first electrode 1 and the second electrode 2 are equal in electric potential, and thus, no electric field is generated between them. A vertical electric field perpendicular to the substrate plane is generated between the third electrode 3 and the first electrode 1, and meanwhile, a transverse electric field parallel to the substrate plane is generated between the third electrode 3 and the fourth electrodes 4 on two sides of it too. Specifically, in the embodiment, still more, a vertical electric field perpendicular to the substrate plane is generated between the fourth electrode 4 and the first electrode 1, and meanwhile, a transverse electric field parallel to the substrate plane is generated between the fourth electrode 4 and the second electrode 2 and the third electrode 3 on two sides of it as well.

In general, in the liquid crystal panel provided by the embodiment, transverse electric fields are generated between the second electrode 2, the third electrode 3 and the fourth electrode 4, respectively, and it is possible that the deflection degree of liquid crystal molecules in the space region between the second electrode and the third electrode is increased without increasing the driving voltage of the second electrode and the third electrode, so as to enhance the luminance of corresponding regions. In turn, the display quality of the liquid crystal display panel and the liquid crystal display can be improved. A vertical electric field is generated between the third electrode 3 and the first electrode 1, a vertical electric field is generated between the fourth electrode 4 and the first electrode 1, so that the number of bright and dark stripes in the liquid crystal display can be reduced, and the display quality of the liquid crystal display panel can be improved accordingly as well.

In an embodiment of the invention, the second electrode strip of the second electrode 2, the third electrode strip of the third electrode 3 and the fourth electrode strip of the fourth electrode 4 on the lower substrate 6 may vary continuously in width on the plane. For example, each of the second electrode strip, the third electrode strip and the fourth electrode strip varies continuously in a manner of being wider in the upper part of the picture, and being narrower in the lower part of the picture. Of course, this is merely an example, and continuous variations in other forms may also be possible.

In an embodiment of the invention, further, the second electrode strip of the second electrode 2, the third electrode strip of the third electrode 3 and the fourth electrode strip of the fourth electrode 4 on the lower substrate 6 may be in a step form on the plane. For example, each of the second electrode strip, the third electrode strip and the fourth electrode strip is narrower in the upper part of the picture, wider in the lower part of the picture, and changed from narrow to wide gradually in steps. Certainly, this is merely an example, and stepwise changes in other forms may also be possible. For example, the reduction in width of the second electrode strip, the third electrode strip and the fourth electrode strip is in the same direction, namely, each shrinks from the lower part to the upper part of the picture, and it may also be the opposite, namely, each shrinks from the upper part to the lower part of the picture.

In an embodiment of the invention, a width of a spacing between the second electrode strip of the second electrode 2 and the fourth electrode strip of the fourth electrode 4 and a width of a spacing between the third electrode strip of the third electrode 3 and the fourth electrode strip of the fourth electrode 4 may be the same or different. In the embodiment of the invention, for example, as shown in FIG. 8, a space width d between the second electrode strip of the second electrode 2 and the fourth electrode strip of the fourth electrode 4 and a space width e between the third electrode strip of the third electrode 3 and the fourth electrode strip of the fourth electrode 4 are different. In one pixel region, if a spacing on the left side of the picture is smaller than a spacing on the right side of the picture, the V-T property will be different, and the viewing angle property is better as well.

In an embodiment of the invention, widths of spacing between any adjacent the second electrode strip of the second electrode 2 and the fourth electrode strip of the fourth electrode 4 are different from each other, and widths of spacing between any adjacent the third electrode strip of the third electrode 3 and the fourth electrode strip of the fourth electrode 4 are different from each other.

In addition, the second electrode strip of the second electrode 2, the third electrode strip of the third electrode 3 and the fourth electrode strip of the fourth electrode 4 in the embodiment of the invention may each be bent into a V shape, and other bending shape, the shape of a folded line or the shape of a straight line may also be possible.

In the liquid crystal display panel provided by the embodiment of the invention, as shown in FIG. 4, the upper substrate 5 further includes a protective layer 7 formed on the first electrode 1. As compared with a structure without the protective layer 7, having the protective layer 7 enables a tilt angle of the electric field to be larger, so that the luminance of corresponding regions is enhanced. In turn, the liquid crystal display panel can be improved.

In addition, it is to be noted that, the lower substrate 6 corresponds to the above array substrate 6, the upper substrate 5 corresponds to the above color filter substrate 5, and thus same reference numerals are used for description.

A liquid crystal display provided by an embodiment of the invention includes the liquid crystal display panel provided by the above embodiment, and the structure of the liquid crystal display panel is the same as that in the above embodiment, whereby details are omitted here.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. An array substrate, corresponding to a plurality of pixel regions, each of the pixel regions being a region surrounded by two adjacent gate lines and two adjacent data lines, each of the pixel regions comprising a first electrode, a second electrode and a third electrode on a side close to a liquid crystal layer, the first electrode comprising a first main portion and more than one first electrode strips connected with the first main portion and branched from the first main portion, the second electrode comprising a second main portion and more than one second electrode strips connected with the second main portion and branched from the second main portion, the third electrode comprising a third main portion and more than one third electrode strips connected with the third main portion and branched from the third main portion, wherein the first electrode, the second electrode and the third electrode in each of the pixel regions are insulated from one another;

the first electrode strips, the second electrode strips and the third electrode strips extend along a first direction and are parallel to one another, the first electrode strips and the second electrode strips are alternately disposed and are interdigitated;

in a second direction crossing with the first direction, each of the third electrode strips is positioned between one of the first electrode strips and one of the second electrode strips that are directly adjacent;

for each pair of the first electrode strip and the second electrode strip that are directly adjacent, one third electrode strip is positioned between the first electrode strip and the second electrode strip.

2. The array substrate according to claim 1, wherein, the first electrode strip, the second electrode strip and the third electrode strip are different from each other in a width.

3. The array substrate according to claim 1, wherein, the first electrode strip, the second electrode strip and the third electrode strip are in the same plane.

4. The array substrate according to claim 1, wherein, a width of a spacing between the first electrode strip and the third electrode strip is different from a width of a spacing between the second electrode strip and the third electrode strip.

5. The array substrate according to claim 4, wherein, widths of spacing between any adjacent the first electrode strip and the third electrode strip are different from each other, and widths of spacing between any adjacent the second electrode strip and the third electrode strip are different from each other.

6. The array substrate according to claim 1, wherein, the first electrode strip, the second electrode strip and the third electrode strip each are bent into a V shape.

7. A liquid crystal display panel, comprising an upper substrate and a lower substrate cell-assembled, and a liquid crystal layer filled between the upper substrate and the lower substrate, an initial orientation state of liquid crystal molecules in the liquid crystal layer is perpendicular to the upper substrate and the lower substrate; wherein, the lower substrate is the array substrate according to claim 1.

8. The liquid crystal display panel according to claim 7, wherein, the upper substrate comprises a fourth electrode on a side close to the liquid crystal layer.

9. The liquid crystal display panel according to claim 8, wherein, the fourth electrode and the first electrode are connected to each other.

10. The liquid crystal display panel according to claim 8, wherein, the upper substrate further comprises:
a protective layer formed on the fourth electrode.

11. A liquid crystal display, comprising the liquid crystal display panel according to claim 7.

12. A driving method of an array substrate, wherein, the array substrate
corresponds to a plurality of pixel regions, each of the pixel regions is a region surrounded by two adjacent gate lines and two adjacent data lines, each of the pixel regions comprises a first electrode, a second electrode and a third electrode on a side close to a liquid crystal layer;

the first electrode comprises a first main portion and more than one first electrode strips connected with the first main portion and branched from the first main portion, the second electrode comprises a second main portion and more than one second electrode strips connected with the second main portion and branched from the second main portion, the third electrode comprises a third main portion and more than one third electrode strips connected with the third main portion and branched from the third main portion;

the first electrode, the second electrode and the third electrode in each of the pixel regions are insulated from one another;

the first electrode strips, the second electrode strips and the third electrode strips extend along a first direction and are parallel to one another, the first electrode strips and the second electrode strips are alternately disposed and are interdigitated;

in a second direction crossing with the first direction, each of the third electrode strips is positioned between one of the first electrode strips and one of the second electrode strips that are directly adjacent;

for each pair of the first electrode strip and the second electrode strip that are directly adjacent, one third electrode strip is positioned between the first electrode strip and the second electrode strip; and the method comprises: controlling an electric potential of the third electrode to fall between an electric potential of the first electrode and an electric potential of the second electrode.

13. The driving method according to claim 12, wherein, the third electrode is in an electrically suspended state.

14. The driving method according to claim 12, wherein, the first electrode strip, the second electrode strip and the third electrode strip are different from each other in a width.

15. The driving method according to claim 12, wherein, the first electrode strip, the second electrode strip and the third electrode strip are in the same plane.

16. The driving method according to claim 12, wherein, a width of a spacing between the first electrode strip and the third electrode strip is different from a width of a spacing between the second electrode strip and the third electrode strip.

17. The driving method according to claim 12, wherein, widths of spacing between any adjacent the first electrode strip and the third electrode strip are different from each other, and widths of spacing between any adjacent the second electrode strip and the third electrode strip are different from each other.

18. The driving method according to claim 12, wherein, the first electrode strip, the second electrode strip and the third electrode strip each are bent into a V shape.

* * * * *